July 30, 1957 W. W. LANDSIEDEL 2,801,047
TYPE AND ADD RACK MECHANISM FOR CALCULATING MACHINES
Original Filed May 12, 1949 4 Sheets-Sheet 2
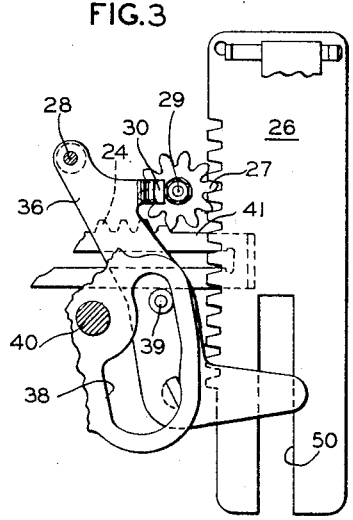
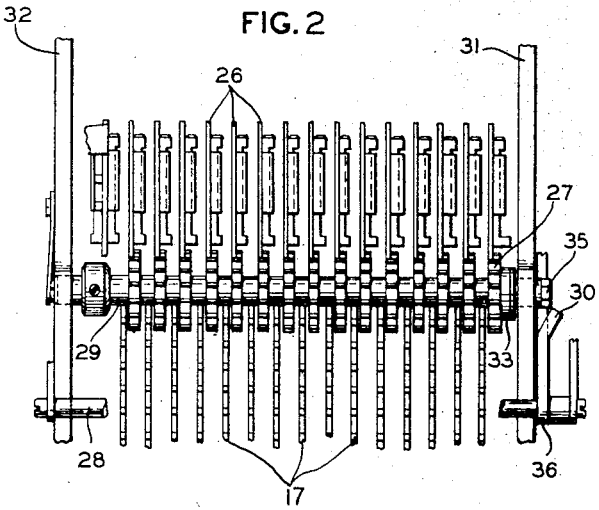
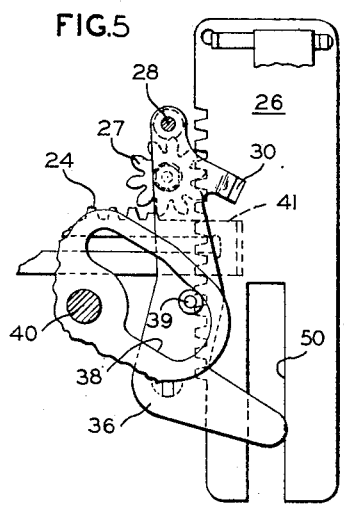
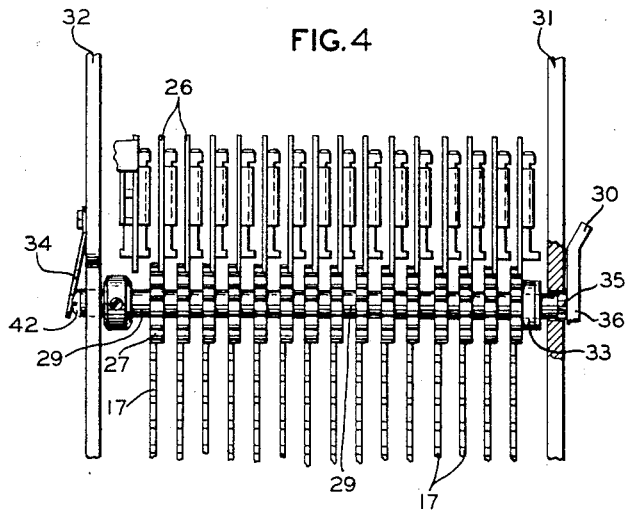
INVENTOR
WALTER W. LANDSIEDEL July 30, 1957  W. W. LANDSIEDEL  2,801,047
TYPE AND ADD RACK MECHANISM FOR CALCULATING MACHINES
Original Filed May 12, 1949  4 Sheets-Sheet 3

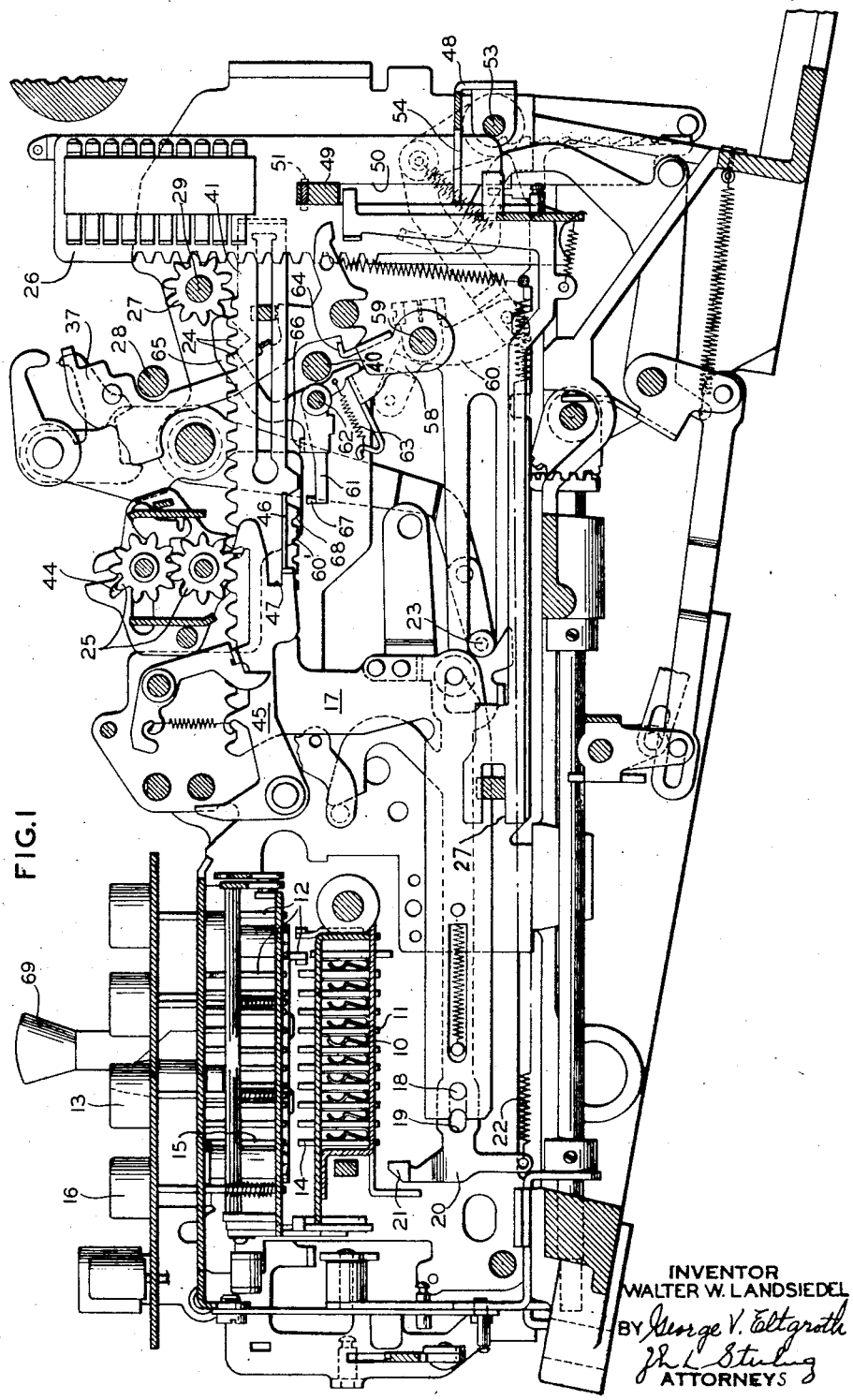

INVENTOR
WALTER W. LANDSIEDEL
BY George V. Eltgroth
J. L. Sterling
ATTORNEYS

July 30, 1957 W. W. LANDSIEDEL 2,801,047
TYPE AND ADD RACK MECHANISM FOR CALCULATING MACHINES
Original Filed May 12, 1949 4 Sheets-Sheet 4
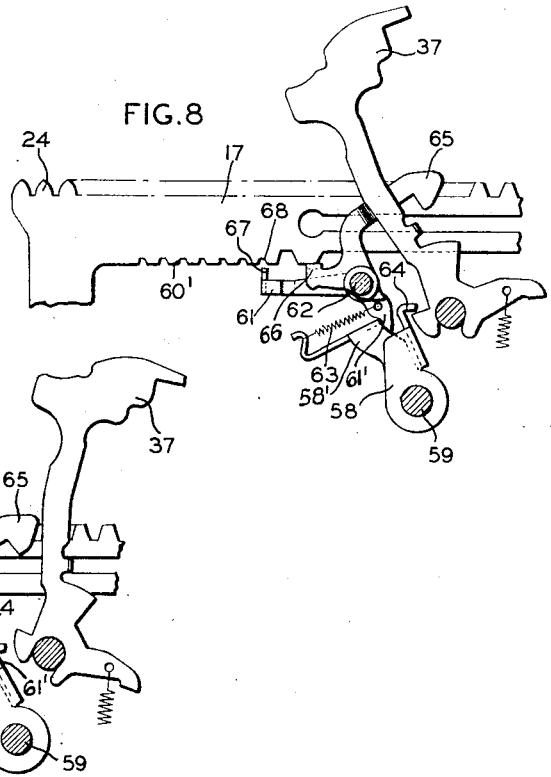
INVENTOR
WALTER W. LANDSIEDEL
BY
ATTORNEYS

United States Patent Office 2,801,047
Patented July 30, 1957

2,801,047

TYPE AND ADD RACK MECHANISM FOR CALCULATING MACHINES

Walter W. Landsiedel, deceased, late of Elmira, N. Y., by Florence E. Landsiedel, executrix, Cincinnati, Ohio, assignor to Sperry Rand Corporation, a corporation of Delaware Original application May 12, 1949, Serial No. 92,814. Divided and this application September 2, 1953, Serial No. 378,152

9 Claims. (Cl. 235—60.31)

This invention relates to calculating machines wherein addition, subtraction, division, regular multiplication, short cut, and discount multiplication problems may be performed and has especial reference to means whereby the machine may perform its various functions in a faster and more efficient manner with elimination of unnecessary movement of various parts, whereby the load on the machine is at times considerably reduced, and whereby there is a considerable decrease in the wear and tear on the parts.

The particular machine wherein the invention is embodied is an improvement upon the machines disclosed in pending application Serial Number 63,164, filed December 2, 1948, now Patent No. 2,688,439, issued September 7, 1954, and it further improves upon the machines set forth in earlier Patents Nos. 1,899,444, 2,203,336, 2,229,980, 2,237,881, and 2,256,622.

This application is a division of application Serial Number 92,814 entitled "Adding and Computing Machine," filed May 12, 1949, now Patent No. 2,726,037, issued December 6, 1955, and relates more particularly to the control of the load on various parts and reduction of wear and tear thereon.

Through new and novel mechanisms and arrangements of parts incorporated herein, this calculator improves upon the earlier machines in a number of ways, for instance, it eliminates the unnecessary movement of the type racks on non-print cycles in multiplication and division problems; it eliminates slamming and jumping of the type racks on totalizing operations; it provides for a faster carry operation; it eliminates noise and wear due to slamming of the adding racks and in general, it is an improved computing and printing machine which, as an integral unit, calculates faster and with less noise, vibration, and movement of the parts than has hitherto been achieved by earlier machines.

In the earlier calculators mentioned the type racks went through a customary up and down movement with each cycle of the machine. This unnecessary movement is eliminated herein by improved mechanism wherein the type racks are in disconnected relation to the adding racks on all non-print operations and also when the adding racks are in carry position. This has been accomplished through the elimination of the last few teeth from the adding racks and by means of laterally shiftable type rack operating gears. By sliding such gears in and out of mesh with the adding racks, the type racks may be engaged with and disengaged from the adding racks. These improvements permit faster non-print operations, faster carrying, eliminate unnecessary movement of the parts, and reduce noise and vibration.

Latching means is also provided for holding the type racks down while in disengaged position in order to prevent any possible jumping of the type racks on carry operations.

Another improvement is concerned with the adding racks and has been made to eliminate noise and slamming of adding racks. On totaling operations, when the accumulators are lifted from the adding racks after the print hammers have fired, there is a tendency for the adding racks to slam toward the rear of the machine. This tendency is eliminated by means of retaining pawls which latch into notches provided in the adding racks to restrain the racks from such rearward movement.

From the above general statements it will be clear that one object of the invention is to increase the carrying speed of the machine and to eliminate unnecessary use of the parts that do not enter into a particular operation such as by disengaging the type racks from the adding racks and permitting their engagement only when required.

A further object is to eliminate the up and down motion of the type racks at times when the use of such racks is not required for the operation being performed.

Still another object is to prevent the adding racks from jumping on total operations after the accumulator wheels have been unmeshed from the adding racks.

The present preferred forms which the invention may assume are illustrated in the drawings, in which:

Fig. 1 is a front to rear vertical section through the machine taken inside the right inner frame and showing certain basic features of the machine illustrating generally the location in the machine of the features of the invention;

Fig. 2 is a detail plan view of the lateral type rack-raising pinion-shift assembly in normal position showing principally the type racks in normal position and their operating pinions shifted laterally out of mesh with the adding racks;

Fig. 3 is a detailed side elevation of the mechanism shown in Fig. 2;

Fig. 4 is a detailed plan view similar to that shown in Fig. 2, but showing the type racks with their operating pinions shifted laterally into operative position with respect to the adding racks;

Fig. 5 is a detailed right side elevation of the mechanism shown in Fig. 4;

Fig. 8 is a detail right side elevation showing principally the adding rack retaining pawl mechanism in normal position before the print hammer is fired; and, Fig. 9 is a view similar to Fig. 8 showing the adding rack latched by a retaining pawl after the hammer has fired.

Figure 6:
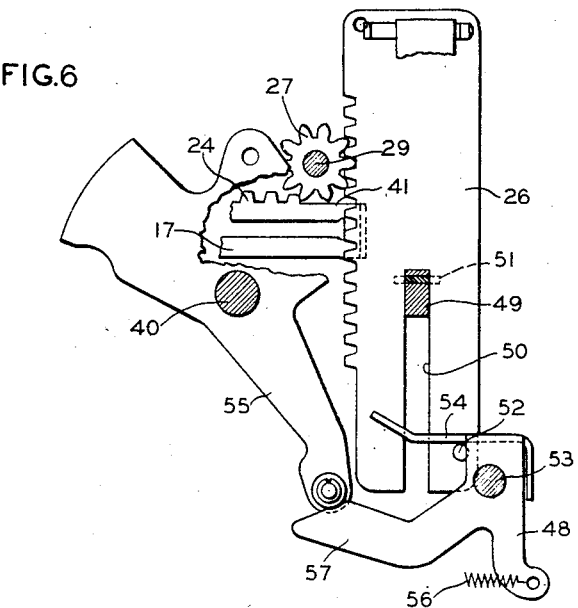
Fig. 6 is a detailed right side elevation of a type rack in zero position disengaged from the adding rack and showing the end portion of an adding rack without teeth, and the locking mechanism for preventing the type racks from rebounding on carry operations.
Figure 7:
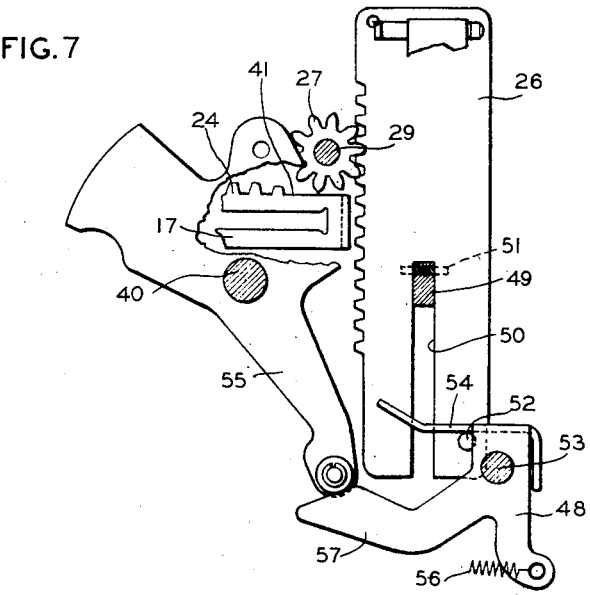
Fig. 7 is a view similar to that of Fig. 6 but disclosing the adding rack in carry position.

The correspondence between the figures in this application and those of the parent application is as follows:

| Present Application | Parent Application |
|---|---|
| Fig. 1 | Fig. 8 |
| Fig. 2 | Fig. 18 |
| Fig. 3 | Fig. 17 |
| Fig. 4 | Fig. 20 |
| Fig. 5 | Fig. 19 |
| Fig. 6 | Fig. 21 |
| Fig. 7 | Fig. 22 |
| Fig. 8 | Fig. 9 |
| Fig. 9 | Fig. 10 |

To further clarify the understanding of the calculator herein it is well to take up the general nature and operation of the machine. Reference is directed especially to Fig. 1 wherein is shown a pin carriage 10, in which is contained a group of stop pins 11 which are depressed or set by the stems 12 of the digit keys 13, with the space stop pins 14 being set by the stems 15 of the space stop key 16. The carriage 10 in normal inactive position is positioned at the right of the machine so as to place the extreme left hand or highest order column of the stop pins beneath the key stems. Suitable escapement mechanism (not shown is provided to permit the carriage to move leftward one step each time a digit key or space key is depressed to place a new column of pins beneath the key stems. Limited in the extent of their movement by the stop pins are adding racks 17, located for longitudinal movement beneath the pin carriage 10. Each of these racks is connected by a pin 18 and slot 19 to an associated slide 20 formed with an upturned heel 21. These slides are held in their normal or forward position against the tension of a spring 22 by means of a bail rod 23 which is cam controlled as shown in Figs. 1, 4, and 6 of Patent No. 2,229,980 through arm 334, roller 331, and cam 315 of that patent. Each time the machine is cycled the bail rod 23 moves rearward releasing and permitting the slides 20 with their associated adding racks 17 to follow upon the pull of the spring 22 until the heels 21 limit against any stops 11 or 14 set up in the path of the heels of the respective slides. These racks 17 extend rearwardly of the machine and are formed with a series of notches or rack teeth 24 along their upper edges for engaging the teeth of the rotatable accumulator pinions 25 and also for engaging the teeth of the rotatable type rack raising pinions 27. These pinions 27 are normally in a position disengaged from the adding racks 17 but engaged with the type racks 26. On the initial part of the first stroke of a machine cycle a hammer restoring bail rod 28, unless blocked by a blocking toe (not shown), as it is during non-print cycles in multiplication and division operations, moves rearward and during this rearward movement there is brought into play a main feature of this invention, namely:

Type rack pinion shift

During this rearward movement the pinion shaft 29, by means of cam 30, and its associated type rack pinions 27 are cammed laterally to a posiiton permitting engagement of the pinions 27 with the adding racks. These pinions, when in engagement with both type racks and adding racks, are adapted, upon being rotated by the adding racks, to raise the type racks a distance in accordance with the extent of the rearward movement permitted to the adding racks as determined by the stops 11 set in the pin carriage 10. The pinions 27 are rotably mounted in proper spaced relation on the shaft 29 which is carried for lateral sliding movement on the inner side frames 31 and 32. The shaft 29 is limited in the extent of its movement to the right by the space washer 33. A flat spring 34 on the left inner side frame 32 constantly tensions the shaft 29 and its associated pinions 27 to the right to a position where the pinions 27 are disengaged from the adding racks 17. While so tensioned by the flat spring the shaft end 35 extends through the right inner side frame 31. Positioned on the right arm 36 of the hammer restoring bail rod 28 is the cam 30.

Responsive to the cycling of the machine, the hammer bail rod 28 moves rearward to unblock the type hammers 37 for printing (Fig. 1). The bail rod 28 is carried at one end thereof by arm 36 operated by cam 38 and roller 39 from the rock shaft 40, which structure finds its counterpart in bail bar 323, arm 324, cam 203, and shaft 52 of Patent No. 2,203,336. The cam 30 moves as shown in Figs. 4 and 5 along with the rod 28 to cam the projecting shaft end 35 and shift the pinion shaft 29 with its associated pinions 27 leftward to place such pinions in engagement with the adding racks 17. A space 41 at the end of the adding racks, formerly occupied by several teeth, facilitates lateral shifting of the pinions 27 for alignment with the racks 17. Upon the pinion shaft 29 being moved laterally, the left end 42 of the shaft is projected through the left inner side frame 32 against the tension of the flat spring 34. As the adding racks 17 progress rearwardly the type rack pinions 27 are engaged and actuated to raise the type racks 26 to printing position. After the hammers have fired, the restoring bail rod 28, on the return stroke of the machine cycle, is drawn forward to restore the type hammers to normal position. On this return movement of the rod 28 the cam 30 is retracted, toward the end of the cycle, from the right shaft end 35. With this retraction of the cam 30, the pinion shaft 29, under tension of the flat spring 34 shifts laterally to the right carrying with it the pinions 27 to normal position out of engagement with the adding racks 17.

In multiplication and division problems performed on the old types of machines as well as on the present machine, the type hammers 37 are prevented from firing on non-print cycles by a blocking arm (not shown) which blocks the rearward movement of the bail rod 28. In the old machines the type racks moved up and down even on such non-print operations. It is apparent, however, on such non-print operations in the present machine, due to the blocking effect of the above mentioned blocking arm preventing the bail rod 28 from moving rearwards, that the type rack raising pinions 27 will not be cammed leftward to engaging position with the adding racks 17 and the normally disengaged type racks 26 will therefore not go through any such unnecessary up and down movements. It can thus be readily seen that by disengaging the type racks from the adding racks, the machine will, on multiplication and division problems, operate faster, quieter and with less parts to be moved.

Carry speed-up mechanism

Another feature of novelty herein is required by the large capacity and generally increased speed of the machine and that is the carry operation. It will be noted from Figs. 6 and 7 that the three rack teeth normally occupying the rear space 41 on the adding racks 17 have been removed. This space permits the adding racks 17, when the type racks 26 have limited in zero position, to be disconnected from the type rack pinions 27 and thereby operatively disconnected from the type racks. Carrying takes place in conventional manner toward the end of a machine cycle. On printing cycles carrying occurs after the type racks have limited in zero position and at a time when the type rack pinions 27 have not as yet been shifted laterally back to normal position out of line with the adding racks. Fig. 6 shows a type rack limited in zero position before carrying takes place. Fig. 7 shows the relative position of the adding rack after carrying has taken place. This innovation of removing the last three teeth from the adding racks allows a faster carrying operation as it eliminates the customary dragging of the type racks on carry operations as will now be described.

The conventional carry or transfer mechanism is shown in Fig. 1. As we know from the earlier mentioned patents, when the accumulator wheels 25 pass from a "9" to "0" or vice versa, carrying takes place when a lug 44 carried by each accumulator wheel on its left side presses down on a carry pawl 45, so that a flange 46 on the adjacent adding rack 17 is free upon forward movement of the rack to enter a pawl notch 47. The adding rack, on such operation, is caused to carry or move an extra unit distance forward of its normal position.

In the former machines where the adding racks by means of the type rack pinions are in engagement with the type racks all of the time, such type racks are drawn or dragged an extra unit distance downward on such carry operations. It is apparent that by removing the last three teeth from the adding racks, the space 41 is created by which the type rack pinions 27 and thereby the type racks 26 will be free of the adding racks 17 on carry operations and as a result, this dragging of the type racks cannot occur in the present herein machine. Elimination of such dragging effects permits a much faster carry operation.

Prevention of rebound of type racks

Another feature of the invention has to do with preventing of rebound of the type racks when disconnected from the adding racks. This rebound and excessive play in the type racks, if permitted to exist in this machine would cause the type rack pinions, which are always in engagement with the type racks, to be, at times, out of position and thereby to create difficulty when the pinions are required to mesh with the adding racks again. This difficulty is eliminated by a comb-like bail 48 which serves to hold the type racks 26 down, when they have limited in zero position upon the type rack guide shim 49, and thereby prevents any excessive up and down play of the type racks.

Referring especially to Figs. 6 and 7, there is shown one of the type racks 26. The racks are slotted at 50 and guided for vertical movement by the type rack guide plate 51. When lowered to their normal or zero position, the type racks limit against the guide shim 49. Carried at the lower ends of the rack 26 are studs 52. Pivoted on a fixed cross shaft 53 is the comb-like bail 48 the teeth 54 of which extend in between the type racks and over the studs 52. When the type racks are limited in normal position, a roller bearing arm 55, fast to the main operating rock shaft 40, hold this bail 48 in its counter-clockwise position against the tension of the bail spring 56 with the bail teeth 54 over the rack studs 52.

It can be seen that upon the rearward stroke of the add rack the arm 55 is raised counter-clockwise with the movement of the main shaft 40 to free the block arm 57 of the bail 48. The type rack bail 48 with its teeth 54 is then drawn by the spring 56 clockwise to free the type racks for vertical movement. Upon the return stroke of the add racks, bail 48 is pressed counter-clockwise by the rack arm 55 acting upon the bail arm 57 to reposition the bail teeth 54 over the rack studs 52.

Prevention of adding rack slam on total taking

A final novel feature of the invention is related to total taking operations. In these operations, the machine first goes through the conventional blank stroke to condition the machine for a total operation. After this blank stroke, the machine is again cycled for the customary total operation. On the rearward stroke of the total cycle, the accumulators wheels 25, as we know from previous disclosures, remain in mesh with the adding racks 17. The adding racks then move rearward to unroll the accumulator wheels to zero position, and with such rearward movement raises the type racks 26 to printing position. The hammer latch bail 58 fixed to shaft 59 is then rocked counter-clockwise through linkage 60 from shaft 53 (Fig. 1) which is in turn oscillated by means not shown. Upon the rocking of the bail 58 the print hammers 37 are released to effect printing at about the start of the return forward stroke. With printing effected, the accumulator wheels 25 in conventional manner are then raised out of mesh from the adding racks 17. It is after this unmeshing on the return total stroke that such adding racks have a decided tendency to jump and slam rearwards.

This difficulty is eliminated in the present machine by the introduction of means to restrain the adding racks 17 against such rearward movement. To accomplish this, rack teeth 60 have been added to the lower edges of the adding racks 17 (Figs. 8 and 9) to be engaged by restraining pawls 61 pivoted on the hammer latch shaft 62 each having an extension 61'. These pawls are normally held disabled in counter-clockwise position by a shoulder 58' on the hammer bail latch 58 against the tension of springs 63. These shoulders engage the extensions 61' as shown in Figs. 8 and 9. It is plain that with the counter-clockwise movement of the bail latch 58 the pawls 61 will be released and spring drawn clockwise to engage the teeth 60 of the adding racks.

In Fig. 8 is shown one of the adding racks which has moved rearwardly and is ready to total in "ones" position. The restraining pawl 61 is shown still held disabled by the bail 58, which bail is normally released about the middle of the machine cycle.

In Fig. 9 the same parts are shown after the print hammer 37 has fired, the hammer being shown released in the usual manner by the sear 64 and uncaught by the hooked hammer latch 65 which has been limited in its clockwise movement by contact of its ear 66 against the bottom edge of the adding rack 17. The pawl 61, released by the bail latch 58, has been spring tensioned clockwise to engage, by its ear 67, the "one's" tooth space 68 of the adding rack 17.

When an adding rack is latched by its associated restraining pawl, it is locked against further rearward movement, but, however, it is able to move forward to return to its normal position. As the rack 17 moves forward to the normal position, the pawl ear 67 is cammed counter-clockwise under pressure of the forwardly moving rack and thereafter rides idly over each succeeding tooth of the rack, continuing in this manner until the rack 17 has finally restored at the end of the return cycle stroke, at which time the hammer bail latch 58 moves clockwise to restore the restraining pawl to disabled position.

In Fig. 1 is shown a control or multiplier lever 69 which through mechanism not shown herein lifts the mentioned blocking arm to prevent rearward movement of the hammer bail rod 28 so that the hammers 37 may not move to print and are thereby disabled.

While hereinbefore has been described what is considered to be a highly desirable embodiment of the invention, it is obvious that many changes in form could be made without departing from the spirit of the invention, and, therefore, no limitation is intended to the exact form herein shown and described, nor to anything less than the whole of the invention as hereinbefore set forth, and as hereinafter claimed.

What is claimed is:

1. In a printing calculating machine, the combination with main operating mechanism, an adding rack and a type rack, of a pinion engageable with said racks and laterally shiftable into and out of engagement with the adding rack, said pinion in either position being in engagement with the type rack, camming means operable by the main operating mechanism for shifting the pinion laterally into engagement with the adding rack, said camming means adapted to be blocked against actuation during non-print cycles of the machine, and automatically acting means associated with said pinion to shift the pinion out of engagement with the adding rack as the camming means moves to inoperative position, said adding rack having a blank toothless space at the rear thereof in which said pinion is disposed when the adding rack is in zero position to facilitate the shifting of the pinion.

2. In a printing calculating machine of the type described, the combination with main operating mechanism of adding racks, type racks normally in disengaged relation to the adding racks, pinions for engaging the type racks with the adding racks, camming means actuable by the main operating mechanism for shifting the pinions laterally to a position for engaging the type racks with the adding racks, said camming means adapted to be blocked against actuation during non-print cycles of the machine, spring means for shifting the pinions laterally back to position disengaging the adding racks from the type racks, said adding racks having a space at the rear thereof to facilitate the shifting of the type rack pinions to engageable position with the adding racks.

3. In a printing calculating machine of the type described, the combination with main operating mechanism of rearwardly movable adding racks, vertically movable type carrying racks normally in disengaged position with respect to the adding racks, and in engaged position with a type rack raising pinion assembly, print hammers operable by the main operating mechanism for striking the type racks, hammer restoring means operable by the main operating mechanism permitting the release of the hammers for effectively striking the type racks and for restoring the hammers after printing has been effected, camming means on the hammer restoring mechanism for shifting the type rack pinion assembly laterally to a position permitting engagement of the type rack raising pinions with the adding racks, spring means for shifting the type rack raising pinion assembly laterally back to position with said pinions out of engagement with the adding racks, said hammer restoring means adapted to be disabled during non-print cycles.

4. In a printing calculating machine of the character described, the combination of a vertically movable type rack engaged with a type rack raising pinion, a rearwardly movable adding rack provided with a series of teeth for engaging the type rack raising pinion, the adding rack having a space at the rear thereof immediately behind the last of said teeth whereby in the space the type rack raising pinion is disconnected from the adding rack when the type rack is in zero position.

5. In a printing calculating machine of the type described, the combination with main operating mechanism having an advance and a return stroke, of rearwardly movable adding racks, latches for restraining the adding racks against rearward movement, latch locking means operable by the main operating mechanism for releasing the latches for engagement with the adding racks at about the start of the return stroke of the main operating mechanism, the locking means operable by the main operating mechanism for relatching the latches out of engagement with the adding racks at about the end of the return stroke of the main operating mechanism.

6. In a printing calculating machine of the type described and equipped to prevent rearward jumping of the adding racks on total operations on the return stroke of the machine after printing has been effected, the combination with main operating mechanism having an advance and a return stroke, of rearwardly moveable adding racks with a series of teeth along their bottom, adding rack restraining latches, means controllable by the main operating mechanism on the return stroke of the main operating mechanism for engaging the latches with the teeth of the racks and for later disengaging the latches toward the end of the return stroke.

7. In a printing calculator of the type described, an adding rack adapted to be moved rearwardly differential distances, a printing hammer, a hammer latch mechanism, a rack latch mechanism, and a main operating mechanism, means operated by the main operating mechanism to operate the hammer latch mechanism to release the hammer for printing after the rack has been moved to a predetermined position, and means on the hammer latch mechanism to hold the rack latch mechanism in inoperative position when the hammer latch mechanism is in operative position, said rack latch mechanism adapted to be released to operative position with respect to the rack when the hammer latch mechanism is moved to inoperative position whereby the rack is held in its set position and prevented from slamming rearwardly until returned to normal through the intermediary of the main operating mechanism.

8. In a printing calculator of the type described, an adding rack adapted to be moved rearwardly differential distances, a printing hammer, a hammer latch mechanism, a rack latch mechanism, and a main operating mechanism, means operated by the main operating mechanism to operate the hammer latch mechanism to release the hammer for printing after the rack has been moved to a predetermined position, a shoulder on the hammer latch mechanism and an extension on the rack latch mechanism in engaging relation with said shoulder, whereby the rack latch mechanism is held in inoperative position while the hammer latch mechanism is in operative position, and a spring connected to the rack latch mechanism to move it to operative position when the hammer latch mechanism is moved to inoperative position.

9. In a printing calculator of the type described, a type rack having a zero position, a bail pivotally disposed adjacent the rack, a pin on said rack, a tooth on the bail adapted to lie over said pin when the rack is in zero position to hold said rack therein, a spring connected to said bail urging it in a direction to release the tooth from the pin, a block arm on said bail, a main operating mechanism, and an arm on said mechanism to engage said block arm to hold the bail tooth in its operative position when the mechanism is at rest, said arm on the mechanism releasing said block arm when the mechanism moves from its position of rest.

References Cited in the file of this patent

UNITED STATES PATENTS

| | | |
|---|---|---|
| 1,118,103 | Carrol | Nov. 24, 1914 |
| 2,034,345 | Kottmann | Mar. 17, 1936 |
| 2,052,905 | Sturm | Sept. 1, 1936 |
| 2,062,963 | Benninger | Dec. 1, 1936 |
| 2,194,270 | Sundstrand | Mar. 19, 1940 |
| 2,226,451 | Sturm | Dec. 24, 1940 |
| 2,255,622 | Landsiedel | Sept. 9, 1941 |
| 2,527,241 | Boyden et al. | Oct. 24, 1950 |